United States Patent [19]

Liu

[11] 4,424,303
[45] Jan. 3, 1984

[54] COMPOSITION OF AN AROMATIC CARBONATE POLYMER, A STYRENE-BUTADIENE STYRENE RADIAL BLACK COPOLYMER AND AN ACRYLATE COPOLYMER

[75] Inventor: Ping Y. Liu, Naperville, Ill.

[73] Assignee: General Electric Company, Mt. Vernon, Ind.

[21] Appl. No.: 352,381

[22] Filed: Feb. 25, 1982

Related U.S. Application Data

[63] Continuation-in-part of Ser. No. 246,709, Mar. 23, 1981, abandoned.

[51] Int. Cl.³ .................... C08L 53/02; C08L 69/00
[52] U.S. Cl. .................................... 525/67; 525/69; 525/92; 525/901; 525/902

[58] Field of Search ............... 525/67, 92, 148, 901, 525/902

[56] References Cited

U.S. PATENT DOCUMENTS

| | | | |
|---|---|---|---|
| 4,048,254 | 9/1977 | Hillier et al. | 525/92 |
| 4,263,415 | 4/1981 | Liu | 525/148 |
| 4,299,928 | 11/1981 | Witman | 525/67 |

FOREIGN PATENT DOCUMENTS

1182807  3/1970  United Kingdom ............... 525/148

*Primary Examiner*—Theodore E. Pertilla
*Attorney, Agent, or Firm*—Martin B. Barancik

[57] ABSTRACT

A composition comprising an aromatic polycarbonate, a styrene-butadiene-styrene radial block copolymer and an acrylate copolymer useful in molded articles.

10 Claims, No Drawings

COMPOSITION OF AN AROMATIC CARBONATE POLYMER, A STYRENE-BUTADIENE STYRENE RADIAL BLACK COPOLYMER AND AN ACRYLATE COPOLYMER

This patent application is a continuation-in-part of co-pending application Ser. No. 246,709 filed Mar. 23, 1981 and now abandoned.

BACKGROUND OF THE INVENTION

High molecular weight aromatic carbonate polymers (aromatic carbonate polymer) are well known for their toughness as evidenced by their impact strength and other high performance characteristics. However, because of their relative difficulty in processing as illustratively exemplified by the temperature necessary to mold articles, certain thin wall intricate articles useful in engineering applications are very difficult if not impossible to economically mold. Therefore, it would be advantageous to have an aromatic carbonate polymer containing composition which is readily processable but substantially maintains aromatic carbonate polymer toughness characteristics in thin section test systems. Concurrent upgrading of the toughness characteristics in thick section test systems is also desirable. Additionally, improved thermal aging stability is also a desirable characteristic.

DESCRIPTION OF THE INVENTION

A new composition has been discovered which has these aforesaid toughness characteristics of an aromatic carbonate polymer but is readily processable and has improved thick section toughness compared with the aromatic carbonate polymer. Additionally, the composition has improved thermal aging stability. In accordance with the invention there is a composition which comprises (a) a major amount of an aromatic carbonate polymer, (b) a styrene-butadiene-styrene (SBS) radial block copolymer, and (c) an acrylate copolymer which is a copolymer of a $C_{1-5}$ acrylate and a $C_{1-5}$ methacrylate.

Aromatic carbonate polymers in the sense of the present invention are to be understood as homopolycarbonates and copolycarbonates and mixtures thereof which have average molecular weights of about 8,000 to more than 200,000 preferably of about 20,000 to 80,000 and an I.V. of 0.40 to 1.0 dl/g as measured in methylene chloride at 25° C. These carbonate polymers are derived from dihydric phenols such as, for example, 2,2-bis(4-hydroxyphenyl)propane (bisphenol-A), bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxydiphenyl)propane, and (3,3'-dichloro-4,4'-dihydroxyphenyl)methane. Other dihydric phenols with are also suitable for use in the preparation of the above carbonate polymers are disclosed in U.S. Pat. Nos. 2,999,835; 3,028,365; 3,334,154 and 4,131,575, all of which are incorporated by reference. Bisphenol-A is preferred.

These aromatic carbonate polymers can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, herein incorporated by reference, or by transesterification processes such as are disclosed in U.S. Pat. No. 3,153,008, herein incorporated by reference, as well as other processes known to those skilled in the art.

The aromatic carbonate polymers utilized in the present invention also include the polymeric derivatives of a dihydric phenol, a dicarboxylic acid, and carbonic acid, or carbonic acid derivatives, for example, phosgene, such as are disclosed in U.S. Pat. No. 3,169,131.

It is also possible to employ two or more different dihydric phenols or a copolymer of a dihydric phenol with a glycol or with hydroxy or acid terminated polyester or with a dibasic acid in the event a carbonate copolymer or interpolymer rather than a homopolymer is desired for use in the preparation of the aromatic carbonate polymer utilized in the practice of this invention. Also employed in the practice of this invention can be blends of any of the above materials to provide the aromatic carbonate polymer.

Branched carbonate polymers, such as are described in U.S. Pat. No. 4,001,184, can also be utilized in the practice of this invention, as can blends of a linear carbonate polymer and a branched carbonate polymer.

The preferred aromatic carbonate polymer is a homopolymer derived from bisphenol-A as the dihydric phenol.

In the styrene-butadiene-styrene radial block copolymer utilized herein, the weight ratio of the components is in the range of about 15–50 styrene: 85–50 butadiene, preferably about 60–70 butadiene: 40–30 styrene.

Suitable SBS block radial copolymers, as defined above, can be prepared by known block copolymerization methods or can be obtained commercially from Phillips as Solprene 414.

The "acrylate" copolymer utilized in the present invention is a copolymer of a $C_1$–$C_5$ methacrylate and a $C_1$–$C_5$ acrylate, wherein the term "$C_1$–$C_5$" represents both saturated and unsaturated, straight or branched chain aliphatic hydrocarbon radicals having from 1 to 5 carbon atoms.

Although various acrylate copolymers can be employed, the preferred copolymer is a multiphase composite interpolymer which comprise a $C_1$–$C_5$ acrylate and $C_{1-5}$ methacrylate as disclosed in U.S. Pat. No. 4,260,693 and U.S. Pat. No. 4,096,202 both of which are incorporated by reference. These interpolymers comprise about 25–95 weight percent of a first elastomeric phase and about 75 to 5 weight percent of a final rigid thermoplastic phase. One or more intermediate phases are optional, for example a midle stage polymerized from about 75 to 100 percent by weight styrene. The first stage is polymerized from about 75 to 99.8 weight percent $C_1$ to $C_5$ alkyl acrylate resulting in an acrylic rubber core and crosslinked with 0.1 to 5 weight percent crosslinking monomer and further containing 0.1 to 5 percent by weight graftlinking monomer. The preferred alkyl acrylate is butyl acrylate.

The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

A preferred multiphase composite interpolymer of the copolymer is commercially available from Rohm and Haas as Acryloid KM-330. This interpolymer has a weight ratio of about 4 parts n-butyl acrylate to about 1 part methyl methacrylate, the remainder of the weight provided by the crosslinking and graftlinking agenets.

The amount of SBS radial block copolymer present in the composition of the present invention can range from about three to about twenty-five percent, by weight of the total composition. Preferably, the SBS radial block copolymer is present in amounts of from about four to about twelve weight percent of the total composition. The amount of the acrylate copolymer present in the composition can vary from about 2 to about 20 weight percent of the total composition. Preferably, the acrylate copolymer is present in amounts of from about 2 to about 15, more preferable about 3 to 10 weight percent of the total composition. The remainder of the composition is aromatic carbonate polymer. The term "total composition" is the sum of all the polymeric constituents of the composition.

It is also regarded to be among the features of this invention to include in the composition of the invention conventional additives for purposes such as reinforcing, coloring, stabilizing or flame retarding the composition in conventional amounts.

The compositions of the invention are prepared by mechanically blending the high molecular weight aromatic polycarbonate with the styrene-butadiene-styrene radial block copolymer and the acrylate copolymer by conventional methods. Double or twin screw extrusion is preferred, particularly where additives are added to the composition.

EXAMPLES

The following examples are set forth to illustrate the invention and are not to be construed to limit the scope of the invention. All percentages are on a weight basis of the total composition unless otherwise specified.

EXAMPLE 1

Ninety-two (92) parts of an aromatic polycarbonate, derived from 2,2-bis(4-hydroxyphenyl)propane and having an intrinsic viscosity (I.V.) in the range of from about 0.46 to about 0.49 dl/g as determined in methylene chloride solution at 25° C., was mixed with three (3) parts of Acryloid KM-330, previously identified, and hereinafter referred to as acrylate copolyer; five (5) parts of a styrene-butadiene-styrene (SBS) radial block copolymer, said copolymer containing 60 weight percent butadiene and 40 weight percent styrene. The ingredients were then blended together by mechanically mixing them in a laboratory tumbler and the resulting mixture was fed to an extruder which was operated at about 255° C. The resulting extrudate was comminuted into pellets. The pellets were injection molded at about 250° C. to 270° C. into test specimens of about 5" by $\frac{1}{2}$" by $\frac{1}{4}$" and 5" by $\frac{1}{2}$" by $\frac{1}{8}$", the latter dimension being the specimen thickness. Izod impact strengths of these specimens are measured according to the Notched Izod test, ASTM D256, and are set forth in Table I. The numerical superscript refers to the percent ductility at the foot lb. value. When H is used as a superscript, it refers to a hinged failure. The sample labeled CONTROL was a bisphenol-A polycarbonate having an I.V. from about 0.46 to about 0.49 dl/g. No other polymers were present in the control.

EXAMPLES 2–3

Further samples of the composition of the invention were prepared as in Example 1 each containing the same kind and quantity of acrylate copolymer as in Example 1, (3%). However, the amount of SBS was increased in each sample to 10% and 20% respectively. Each increase in SBS concentration brought about a concomitant decrease in aromatic polycarbonate concentration. The samples were tested as in Example 1. Below are the results for the impact test.

TABLE 1

| EXAMPLE | SBS WT. % | NOTCHED IZOD, ft-lb/in. | |
|---|---|---|---|
| | | $\frac{1}{8}$ inch | $\frac{1}{4}$ inch |
| Control | — | $14.8^{100}$ | $1.6^{0}$ |
| 1 | 5 | $14.0^{100}$ | $6.6^{60}$ |
| 2 | 10 | $11.9^{100}$ | $4.1^{H}$ |
| 3 | 20 | $7.9^{100}$ | $2.4^{H}$ |

The results demonstrate that the impact strength of the new composition is substantially retained in comparison to the control with respect to the $\frac{1}{8}$" samples. The impact strengths are substantially improved in the $\frac{1}{4}$" samples. A hinged failure is significantly better than a brittle failure in that some of the sample remains in a continuous mass. Processability of the novel composition is significantly improved over the control.

As used in the specification, improved thermal aging stability relates to retention of ductility in the Notched Izod test system.

What is claimed is:
1. A composition which comprises in admixture
   a. a major amount of an aromatic carbonate polymer,
   b. an acrylate copolymer comprising a copolymper of an alkyl acrylate and an alkyl methacrylate, each of the said alkyl having independently one to five carbon atoms, inclusive, and c. a styrene-butadiene-styrene radial block copolymer present in from about three to about twenty-five weight percent of the total composition of a+b+c.

2. A composition in accordance with claim 1 wherein the acrylate copolymer is from about two to about twenty weight percent of the total composition.

3. A composition in accordance with claim 2 wherein the styrene-butadiene-styrene copolymer is from about four to about twelve weight percent.

4. A composition in accordance with claim 3 wherein the acrylate copolymer is from about two to about fifteen weight percent.

5. A composition in accordance with claim 4 wherein the acrylate copolymer is a multiphase composite interpolymer comprising about 25 to 95 weight percent of a first elastomeric phase polymerized from a monomer system comprising about 75 to 99.8 percent by weight of a $C_{1-5}$ alkyl acrylate, a crosslinking monomer, a graftlinking monomer and about 75 to 5 weight percent of a final rigid thermoplastic phase.

6. A composition in accordance with claim 5 wherein the aromatic carbonate polymer is a homopolymer and the styrene-butadiene-styrene copolymer is from about three to about 12 weight percent.

7. A composition in accordance with claim 6 wherein the homopolymer is derived from bisphenol-A.

8. A composition in accordance with claim 7 wherein the monomer system of the elastomeric phase is n-butyl acrylate and the final rigid thermoplastic phase is derived from methylmethacrylate.

9. A composition in accordance with claim 8 wherein the weight ratio of n-butyl acrylate to methylmethacrylate is about 4 to 1.

10. A composition in accordance with claim 3 wherein the styrene-butadiene-styrene radial block copolymer contains about 15–50 weight percent styrene and about 50–85 weight percent butadiene.

* * * * *